United States Patent
Mello et al.

(10) Patent No.: US 7,237,539 B2
(45) Date of Patent: Jul. 3, 2007

(54) CONTROL METHOD AND APPARATUS FOR USE IN AN ALCOHOL FUELED INTERNAL COMBUSTION ENGINE

(75) Inventors: John Paul Mello, Newton, MA (US); Peter Palmer, Carson City, NV (US); Jan-Roger Linna, Boston, MA (US)

(73) Assignee: Philip Morris USA Inc., Richmond, VA (US)

( * ) Notice: Subject to any disclaimer, the term of this patent is extended or adjusted under 35 U.S.C. 154(b) by 128 days.

(21) Appl. No.: 10/975,304

(22) Filed: Oct. 28, 2004

(65) Prior Publication Data

US 2005/0126551 A1    Jun. 16, 2005

Related U.S. Application Data

(60) Provisional application No. 60/515,925, filed on Oct. 30, 2003.

(51) Int. Cl.
*F02D 41/06* (2006.01)
(52) U.S. Cl. ..................................................... 123/549
(58) Field of Classification Search ........ 123/543–557, 123/179.19
See application file for complete search history.

(56) References Cited

U.S. PATENT DOCUMENTS

| | | | |
|---|---|---|---|
| 3,868,939 A * | 3/1975 | Friese et al. ........... | 123/179.15 |
| 4,369,736 A | 1/1983 | Ito | |
| 4,383,507 A | 5/1983 | Powell | |
| 4,387,676 A | 6/1983 | Couceiro | |
| 4,401,879 A | 8/1983 | Shukla et al. | |
| 4,646,691 A | 3/1987 | Kiyota et al. | |
| 4,706,629 A | 11/1987 | Wineland et al. | |
| 4,706,630 A | 11/1987 | Wineland et al. | |
| 4,870,932 A | 10/1989 | Asmus | |
| 4,905,655 A | 3/1990 | Maekawa | |
| 4,911,116 A | 3/1990 | Prohaska et al. | |
| 4,982,709 A | 1/1991 | Oota | |

(Continued)

FOREIGN PATENT DOCUMENTS

DE        30 17 591        11/1981

(Continued)

*Primary Examiner*—Marguerite McMahon
(74) *Attorney, Agent, or Firm*—Roberts, Mlotkowski & Hobbes

(57) ABSTRACT

A method for controlling a fuel system of an internal combustion engine. The method is employed with a fuel system having a source of alcohol-containing liquid fuel, at least one fuel injector, a heat source for heating the liquid fuel in the at least one fuel injector, the heat source capable of heating the liquid fuel to a level sufficient to convert at least a portion thereof from the liquid state to a vapor state and a metering valve operable to achieve a range of flow rates characterized by a valve open versus valve closed duty cycle. The method includes the steps of metering a predetermined amount of fuel based on engine operating conditions, controlling power supplied to the heat source of the at least one fuel injector to achieve a target temperature, determining alcohol concentration of the fuel and adjusting the power supplied to the heat source of the at least one fuel injector based on the alcohol concentration determination. A method of determining alcohol concentration and a fuel system for use in an alcohol fueled internal combustion engine is also provided.

13 Claims, 9 Drawing Sheets

U.S. PATENT DOCUMENTS

| | | |
|---|---|---|
| 5,038,730 A | 8/1991 | Kashima |
| 5,044,344 A | 9/1991 | Tuckey et al. |
| 5,050,555 A | 9/1991 | Mitsumoto |
| 5,090,389 A | 2/1992 | Oota |
| 5,119,794 A | 6/1992 | Kushida et al. ............. 123/549 |
| 5,179,926 A | 1/1993 | Ament |
| 5,183,021 A | 2/1993 | Suga et al. |
| 5,186,149 A | 2/1993 | Kitajima et al. |
| 5,190,001 A | 3/1993 | Dieter et al. |
| 5,255,656 A | 10/1993 | Rader et al. |
| 5,327,866 A | 7/1994 | Kitajima |
| 5,390,640 A | 2/1995 | Saito et al. |
| 5,400,758 A | 3/1995 | Rader et al. |
| 5,402,763 A | 4/1995 | Saito et al. |
| 5,415,145 A | 5/1995 | Letcher et al. |
| 5,881,703 A | 3/1999 | Nankee, II et al. |
| 5,950,599 A | 9/1999 | Rotramel et al. |
| 6,237,575 B1 | 5/2001 | Lampert et al. |
| 2002/0092508 A1 | 7/2002 | Kanekawa et al. |
| 2003/0178010 A1* | 9/2003 | Pellizzari et al. ............ 123/549 |
| 2003/0178011 A1 | 9/2003 | Pellizzari et al. ............ 123/549 |

FOREIGN PATENT DOCUMENTS

| | | |
|---|---|---|
| WO | WO 03/083281 | 10/2003 |

* cited by examiner

CONTROL METHOD AND APPARATUS FOR USE IN AN ALCOHOL FUELED INTERNAL COMBUSTION ENGINE

RELATED APPLICATION

This patent application claims priority to Provisional Application Ser. No. 60/515,925, filed on Oct. 30, 2003, the contents of which are incorporated by reference in their entirety.

FIELD

The present invention relates to fuel delivery in an internal combustion engine.

BACKGROUND

In light of the evermore stringent emissions regulations that are planned to take effect over the next few years, including California Low Emission Vehicle II (LEV II), Federal USA EPA Tier 2 and European Union EU-IV, pre-catalyst engine-out HC emissions, especially during cold start and warm-up, are attracting significant efforts in research and development. This is due in large part to the fact that as much as 80 percent of the total hydrocarbon emissions produced by a typical, modern light-duty vehicle during the Federal Test Procedure (FTP) can occur during the first 120 seconds of the test.

These high levels of emissions are largely attributable to cold engine and exhaust component temperatures. Specifically, cold engine components necessitate fuel-rich operation, in which the excess fuel is used to compensate for the portion of fuel that has attached to the walls of the intake system and combustion chamber and, thus, is not readily combusted. In addition, a cold three-way catalyst cannot reduce a significant amount of the unburned hydrocarbons that pass through the engine during cold-start. As a result, high concentrations of unburned hydrocarbons are emitted from the tailpipe. It is understood that the over-fueling associated with excessive hydrocarbon emissions during cold-start could be substantially eliminated through the use of vaporized rather than liquid fuels.

A variety of systems have been devised to supply fine liquid fuel droplets and air to internal combustion engines that work relatively well after engine warm-up. These systems either supply fuel directly into the combustion chamber (direct injection) or utilize a carburetor or port fuel injectors to supply the mixture through an intake manifold into a combustion chamber (indirect injection). In currently employed systems, the fuel-air mixture is produced by atomizing a liquid fuel and supplying it as fine droplets into an air stream.

In conventional spark-ignited engines employing port-fuel injection, the injected fuel is vaporized by directing the liquid fuel droplets at hot components in the intake port or manifold. Under normal operating conditions, the liquid fuel films on the surfaces of the hot components and is subsequently vaporized. The mixture of vaporized fuel and intake air is then drawn into the cylinder by the pressure differential created as the intake valve opens and the piston moves towards bottom dead center. To ensure a degree of control that is compatible with modern engines, this vaporizing technique is typically optimized to occur in less than one engine cycle.

Under most engine operating conditions, the temperature of the intake components is sufficient to rapidly vaporize the impinging liquid fuel droplets. However, as indicated, under conditions such as cold-start and warm-up, the fuel is not vaporized through impingement on the relatively cold engine components. Instead, engine operation under these conditions is ensured by supplying excess fuel so that a sufficient fraction evaporates through heat and mass transfer as it travels through the air prior to impinging on a cold intake component. Evaporation rate through this mechanism is a function of fuel properties, temperature, pressure, relative droplet and air velocities and droplet diameter. Of course, this approach breaks down in extreme ambient cold-starts, in which the fuel volatility is insufficient to produce vapor in ignitable concentrations with air.

The mandate to reduce air pollution has resulted in attempts to compensate for combustion inefficiencies with a multiplicity of fuel system and engine modifications. As evidenced by the prior art relating to fuel preparation and delivery systems, much effort has been directed to reducing liquid fuel droplet size, increasing system turbulence and providing sufficient heat to vaporize fuels to permit more complete combustion.

Given the relatively large proportion of unburned hydrocarbons emitted during startup, this aspect of light duty vehicle engine operation has been the focus of significant technology development efforts. Furthermore, as increasingly stringent emissions standards are enacted into legislation and consumers remain sensitive to pricing and performance, these development efforts will continue to be paramount. One general class of solutions employed to reduce engine startup emissions involves fuel vaporization. Key practical challenges to providing vaporized fuel include the fact that metering fuel vapor is problematic, and thus most approaches to reducing cold-start emissions focus on metering the fuel as a liquid and then vaporizing it. Heated fuel injector concepts with fuel heaters or vaporizers added on at the outlet of the injector generally suffer from poor atomization and fuel targeting once the heater is turned off. In addition, heated injector and heated impingement plates suffer from an intrinsic design challenge between minimizing the power required to the heating element and minimizing the vaporizer warm-up time. For practical purposes, the heating time associated with both heated injectors and heated impingement plates is too long unless excessive electrical power is supplied.

Also of interest to the future of the transportation sector is the supplementation or potential replacement of petroleum-based fuels. Alcohol fuels provide an attractive alternative to petroleum-based fuels for automotive applications since these fuels are renewable and derived from a number of sources, including those that are domestically available such as corn. Furthermore, alcohol is free of many of the technical barriers that have limited the market penetration of other alternative fuels for light-duty passenger vehicle applications.

Advantages associated with the use of alcohol fuels include the fact that they readily blend with petroleum-based fuel. As a result, alcohol fuels are compatible with the existing petroleum infrastructure, although some modifications are required. The ability to blend alcohol and petroleum-based fuels permit the gradual introduction of this alternative fuel and further allows for alcohol production to ramp up in accordance with demand rather than in anticipation of demand. Another advantage of alcohol fuels is that they are liquid at ambient conditions, eliminating the need for specialized storage and/or injection systems. Additionally, vehicular modifications required to accommodate alcohol fuels are relatively straightforward, with the cost being transparent to the consumer.

Despite these and other advantages associated with alcohol fuels, there are also distinct challenges associated with the use of neat alcohol fuels and alcohol/petroleum blends containing a high volumetric fraction of alcohol. One such challenge is cold starting an engine operating on a predominantly alcohol mixture. As is well known, alcohol fuels have a much lower volatility than gasoline and, as such, do not readily evaporate and subsequently ignite during cold-start and warm-up conditions.

Current approaches to addressing the challenge associated with alcohol-fueled engines often involve the use of an alcohol fuel sensor to provide feedback to the engine control unit (ECU). Within the ECU, the alcohol fuel sensor signal is used primarily for two purposes: 1) to determine whether or not a heat source should be used to vaporize the fuel upon cold-start and warm-up of the engine and 2) to adjust the fuel injection parameters for cold-start, warm-up and normal operation of the engine.

One particular solution to the aforementioned challenges associated with fuel vaporization in alcohol-fueled internal combustion engines involves the use of capillary passages to vaporize fuel. The use of capillary passages offers a number of distinct advantages over other techniques that are directed at supplying vaporized fuel to internal combustion engines. In particular, the high surface area to volume ratio of a capillary passage combined with the relatively low thermal mass associated with certain capillary structures result in fast warm up times (on the order of less than 0.5 seconds) and minimal power requirements (on the order of 150 watts per cylinder) necessary to achieve a desired heating profile. Yet another advantage of capillary passages used in fuel vaporization is that the capillary design may be integrated with the functionality of a conventional fuel injector so that a single injector can supply both liquid and vaporized fuel, depending upon the selected emission control strategy.

One form of a capillary passage-based fuel vaporizer is disclosed in U.S. application Ser. No. 10/284,180, filed on Oct. 31, 2002. In that application, a fuel system for use in an internal combustion engine is disclosed and a preferred form includes a plurality of fuel injectors, each injector including (i) at least one capillary flow passage, the at least one capillary flow passage having an inlet end and an outlet end, (ii) a heat source arranged along the at least one capillary flow passage, the heat source operable to heat a liquid fuel in the at least one capillary flow passage to a level sufficient to convert at least a portion thereof from the liquid state to a vapor state, and (iii) a valve for metering fuel to the internal combustion engine, the valve located proximate to the outlet end of the at least one capillary flow passage, a liquid fuel supply system in fluid communication with the plurality of fuel injectors, a controller to control the power supplied to the heat source of each of the plurality of fuel injectors to achieve a predetermined target temperature, the predetermined target temperature is operable to convert a portion of liquid fuel to the vapor state; means for determining engine air flow of the internal combustion engine, and a sensor for measuring a value indicative of degree of engine warm-up of the internal combustion engine, the sensor operatively connected to the controller; and wherein the portion of liquid fuel to be converted to the vapor state is controlled with reference to sensed internal combustion engine conditions to achieve minimal exhaust emissions.

The fuel system disclosed in application Ser. No. 10/284,180 is effective in reducing cold-start and warm-up emissions of an internal combustion engine. Efficient combustion is promoted by forming an aerosol of fine droplet size when the substantially vaporized fuel condenses in air. The vaporized fuel can be supplied to a combustion chamber of an internal combustion engine during cold-start and warm-up of the engine and reduced emissions can be achieved.

application Ser. No. 10/284,180 also discloses a method for controlling the fuel system and delivering fuel to an internal combustion engine for a fuel system including at least one fuel injector having at least one capillary flow passage, a heat source arranged along the at least one capillary flow passage, the heat source capable of heating a liquid fuel in the at least one capillary flow passage to a level sufficient to convert at least a portion thereof from the liquid state to a vapor state, and a valve for metering fuel to the internal combustion engine, the valve located proximate to an outlet end of the at least one capillary flow passage. The method includes the steps of determining engine air flow of the internal combustion engine, measuring a value indicative of degree of engine warm-up of the internal combustion engine, determining a portion of liquid fuel to be converted to the vapor state by the at least one capillary flow passage, the determining step employing the measured values, controlling power supplied to the heat source of the at least one fuel injector to achieve a predetermined target temperature, the predetermined target temperature is operable to convert the portion of liquid fuel to the vapor state so determined and delivering the fuel to a combustion chamber of the internal combustion engine and wherein the portion of liquid fuel to be converted to the vapor state is determined to achieve minimal exhaust emissions.

According to one preferred form described in application Ser. No. 10/284,180, the capillary flow passage can include a capillary tube and the heat source can include a resistance-heating element or a section of the tube heated by passing electrical current therethrough. The fuel supply can be arranged to deliver pressurized or non-pressurized liquid fuel to the flow passage. The apparatus can provide a stream of vaporized fuel that mixes with air and forms an aerosol that can be carried by an air stream, regardless of the flow path, into the combustion chamber.

As further described in application Ser. No. 10/284,180, the target temperature of the capillary is determined through the use of a control algorithm designed to achieve an appropriate target setpoint. The target setpoint is the ratio of the hot resistance of the capillary to the cold (unheated) resistance of the capillary ($R/R_o$). The ratio $R/R_o$, in turn, corresponds to a desired bulk capillary temperature. The duty cycle of the electronic fuel injector, as requested by an ECU, provides an indication of the target amount of fuel that should be supplied to the engine. The exhaust gas oxygen sensor provides an indication of the fuel that actually has been supplied by the injectors to the engine.

Despite the advances in the area of fuels systems for use in internal combustion engines, a need exists for a system capable of addressing the difficulties associated with fuel vaporization in engines operating on alcohol fuel or alcohol-gasoline fuel blends and methods for controlling such fuel systems.

SUMMARY

A method for controlling a fuel system of an internal combustion engine. The method may be employed with a fuel system having a source of alcohol-containing liquid fuel, at least one fuel injector, a heat source for heating the liquid fuel in the at least one fuel injector, the heat source capable of heating the liquid fuel to a level sufficient to convert at least a portion thereof from the liquid state to a vapor state and a metering valve operable to achieve a range of flow rates characterized by a valve open versus valve closed duty cycle. The method includes the steps of metering a predetermined amount of fuel based on engine operating conditions, controlling power supplied to the heat source of the at least one fuel injector to achieve a target temperature, determining alcohol concentration of the fuel; and adjusting the power supplied to the heat source of the at least one fuel injector based on the alcohol concentration determination.

Also provided is a method of determining alcohol concentration of a source of liquid fuel for a fuel system of an internal combustion engine, the fuel system including at least one fuel injector, a heat source for heating the liquid fuel in the at least one fuel injector, the heat source capable of heating the liquid fuel to a level sufficient to convert at least a portion thereof from the liquid state to a vapor state and a metering valve operable to achieve a range of flow rates characterized by a valve open versus valve closed duty cycle. The method includes the steps of metering a predetermined amount of fuel based on engine operating conditions, establishing a resistance value for the heat source of the capillary flow passage, the resistance value relatable to a predetermined target temperature, wherein the predetermined target temperature is operable to convert a portion of liquid fuel to the vapor state, controlling power supplied to the heat source of the at least one fuel injector to achieve a target temperature, measuring the power supplied to the heat source of the capillary flow passage and measuring the duty cycle of the metering valve, wherein the alcohol concentration is determined using a predetermined relationship between injector mass flow rate at a measured duty cycle for the at least one fuel injector and power supplied to the heat source.

Also provided is a fuel system for use in an alcohol fueled internal combustion engine having a source of liquid fuel. The fuel system includes a plurality of fuel injectors, a heat source for heating the liquid fuel in the at least one fuel injector, the heat source operable to heat liquid fuel to a level sufficient to convert at least a portion thereof from the liquid state to a vapor state, a metering valve for metering fuel to the internal combustion engine, said metering valve operable to achieve a range of flow rates characterized by a valve open versus valve closed duty cycle, a controller to control the power supplied to the heat source of each of the plurality of fuel injectors to achieve a predetermined target temperature and a sensor for measuring a value indicative of degree of engine warm-up of the internal combustion engine, wherein the fuel system is capable of determining the alcohol concentration of the source of liquid fuel.

In one aspect a fuel system having improved fuel vaporization characteristics under most engine operating conditions, particularly cold-start and warm-up conditions, is provided for use with alcohol and alcohol-gasoline blends.

In another aspect, a fuel injector and delivery system capable of reducing emissions and improving fuel efficiency when using alcohol and alcohol-gasoline blends is provided.

In yet another aspect a fuel injector and delivery system that can supply vaporized fuel while requiring minimal power and warm-up time is provided, the fuel injector and delivery system having utility with alcohol and alcohol-gasoline blends.

In a further aspect, an improved fuel system using capillary passages for vaporization is provided.

In a still further aspect, a fuel system using capillary passages in which capillary temperature can be accurately controlled over time and in response to changes in the alcohol concentration of the fuel is provided.

BRIEF DESCRIPTION OF THE DRAWINGS

The invention will now be described in more detail with reference to preferred forms of the invention, given only by way of example, and with reference to the accompanying drawings, in which.

DETAILED DESCRIPTION

Figure 1:
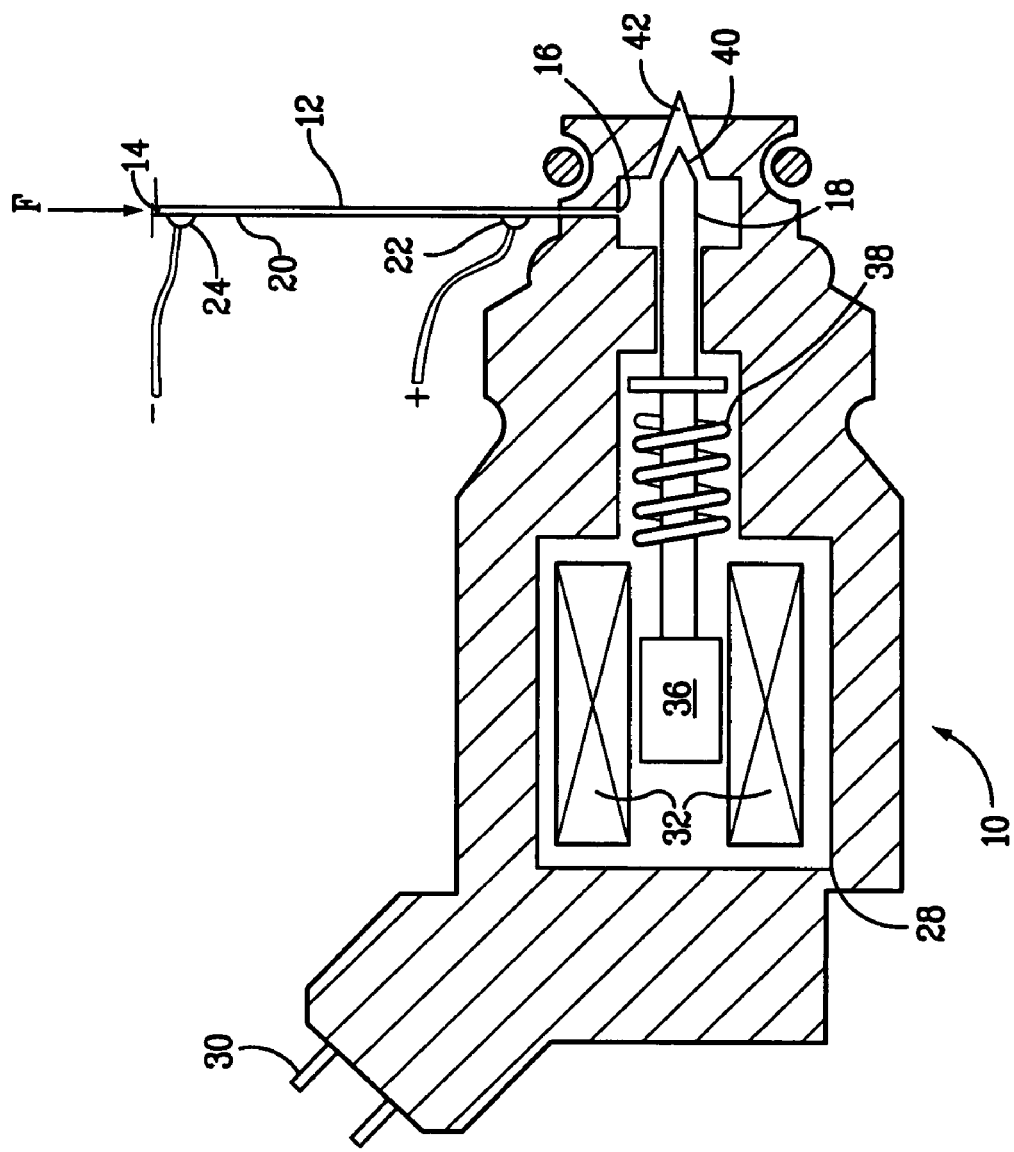
FIG. 1 illustrates an in-line-heated injector having an electrically heated capillary, in partial cross section, incorporated upstream of a modified conventional side-fed port fuel injector, in accordance with a preferred form.

Reference is now made to the embodiments illustrated in FIGS. 1–9 wherein like numerals are used to designate like parts throughout.

Provided is a fuel system and method for its control that is useful for cold-start, warm-up and normal operation of an alcohol-fueled internal combustion engine. The fuel system includes a fuel injector having a capillary flow passage, capable of heating liquid fuel so that substantially vaporized fuel is supplied into an engine cylinder. The substantially vaporized fuel can be combusted with reduced emissions compared to conventional fuel injector systems. Furthermore, the fuel system is capable of determining the alcohol concentration of the fuel, requires less power, and has shorter warm-up times than other vaporization techniques.

Since alcohol-based fuels have a much lower volatility than gasoline they do not readily evaporate and ignite during cold-start and warm-up conditions as conventional gasoline does. Moreover, since gasoline does not readily vaporize at low temperatures, cold-start and warm-up with alcohol-gasoline blends can be problematic. Whether using an alcohol-gasoline blend, neat alcohol or neat gasoline, during the cold start and warm-up period, relatively little vaporization of the liquid fuel takes place. Depending upon the ambient conditions and the relative alcohol concentration of the fuel, the use of an excess of liquid fuel to each cylinder of the engine results in an air/fuel mixture that will combust. Upon ignition of the fuel vapor, which is generated from the excess of liquid fuel, combustion gases discharged from the cylinders include unburned fuel and undesirable gaseous emissions. However, upon reaching normal operating temperature, liquid fuel readily vaporizes, so that less fuel is needed to achieve an air/fuel mixture that will readily combust. Advantageously, upon reaching normal operating temperature, the air/fuel mixture can be controlled at or near stoichiometric ratio, thereby reducing emissions of unburned hydrocarbons and carbon monoxide. Additionally, when fueling is controlled at or near stoichiometric ratio, just enough air is available in the exhaust stream for simultaneous oxidation of unburned hydrocarbons and carbon monoxide and reduction of nitrogen oxides over a three-way catalyst (TWC).

The system and method of the present invention injects alcohol or an alcohol-gasoline blend that has been substantially vaporized into the intake flow passage, or directly into an engine cylinder, thereby eliminating the need for excess fuel during the start-up and warm-up period of an engine. The alcohol or an alcohol-gasoline blend is preferably delivered to the engine in a stoichiometric or fuel-lean mixture, with air, or air and diluent, so that virtually all of the fuel is burned during the cold start and warm-up period.

With conventional port-fuel injection, over-fueling is required to ensure robust, quick engine starts. Under fuel-rich conditions, the exhaust stream reaching the three-way catalyst does not contain enough air to oxidize the excess fuel and unburned hydrocarbons as the catalyst warms up. One approach to address this issue is to utilize an air pump to supply additional air to the exhaust stream upstream of the catalytic converter. The objective is to generate a stoichiometric or slightly fuel-lean exhaust stream, which can react over the catalyst surface once the catalyst reaches its light-off temperature. In contrast, the system and method of the present invention enables the engine to determine the amount of alcohol present and operate at stoichiometric or even slightly fuel-lean conditions during the cold-start and warm-up period, eliminating both the need for over-fueling and the need for an additional exhaust air pump, reducing the cost and complexity of the exhaust after treatment system.

Another approach to address catalyst warm-up during the cold start and warm-up period, is to deliberately operate the engine very fuel-rich during this period. Using an exhaust air-pump to supply air in this fuel-rich exhaust stream, a combustible mixture can be generated which is burned either by auto-ignition or by some ignition source upstream of, or in, the catalytic converter. The exotherm produced by this oxidation process significantly heats up the exhaust gas and the heat is largely transferred to the catalytic converter as the exhaust passes through the catalyst. Using the system and method of the present invention, the engine could be controlled to operate alternating cylinders fuel-rich and fuel-lean to achieve the same effect but without the need for an air pump. For example, with a four-cylinder engine, two cylinders could be operated fuel-rich during the cold-start and warm-up period to generate unburned hydrocarbons in the exhaust. The two remaining cylinders would be operated fuel-lean during cold-start and warm-up, to provide oxygen in the exhaust stream.

In a preferred form, a fuel system according to the invention includes at least one capillary-sized flow passage through which pressurized fuel flows before being injected into an engine for combustion. A capillary-sized flow passage can be provided with a hydraulic diameter that is preferably less than 2 mm, more preferably less than 1 mm, and most preferably less than 0.5 mm. Hydraulic diameter is used in calculating fluid flow through a fluid carrying element. Hydraulic radius is defined as the flow area of the fluid-carrying element divided by the perimeter of the solid boundary in contact with the fluid (generally referred to as the "wetted" perimeter). In the case of a fluid carrying element of circular cross section, the hydraulic radius when the element is flowing full is $(\pi D^2/4)/\pi D = D/4$. For the flow of fluids in noncircular fluid carrying elements, the hydraulic diameter is used. From the definition of hydraulic radius, the diameter of a fluid-carrying element having circular cross section is four times its hydraulic radius. Therefore, hydraulic diameter is defined as four times the hydraulic radius.

Heat is applied along the capillary passageway, resulting in at least a portion of the liquid alcohol or alcohol-gasoline blend entering the flow passage is converted to a vapor as it travels along the passageway. The alcohol or alcohol-gasoline blend exits the capillary passageway substantially as a vapor, which Is optionally may contain a minor proportion of heated liquid fuel, which has not been vaporized. By substantially vaporized, it is meant that at least 50% of the volume of the liquid fuel is vaporized by the heat source, more preferably at least 70%, and most preferably at least 80% of the liquid fuel is vaporized. Although it may be difficult to achieve 100% vaporization due to complex physical effects that take place, nonetheless complete vaporization would be desirable. These complex physical effects include variations in the boiling point of the fuel since the boiling point is pressure dependent and pressure can vary in the capillary flow passage. Thus, while it is believed that a major portion of the fuel reaches the boiling point during heating in the capillary flow passage, some of the liquid fuel may not be heated enough to be fully vaporized with the result that a portion of the liquid fuel passes through the outlet of the capillary flow passage along with the vaporized fluid.

In a preferred form of the fuel injector of the present invention, the capillary-sized fluid passage is formed in a capillary body such as a single or multilayer metal, ceramic or glass body. The passage has an enclosed volume opening to an inlet and an outlet either of which, or both, may be open to the exterior of the capillary body or may be connected to another passage within the same body or another body or to fittings. The heater can be formed by a portion of the body such as a section of a stainless steel tube or the heater can be a discrete layer or wire of resistance heating material incorporated in or on the capillary body. The fluid passage may be any shape comprising an enclosed volume opening to an inlet and an outlet and through which a fluid may pass. The fluid passage may have any desired cross-section with a preferred cross-section being a circle of uniform diameter. Other capillary fluid passage cross-sections include non-circular shapes such as triangular, square, rectangular, oval or other shape and the cross section of the fluid passage need not be uniform. The fluid passage can extend rectilinearly or non-rectilinearly and may be a single fluid passage or multi-path fluid passage. In the case where the capillary passage is defined by a metal capillary tube, the tube can have an inner diameter of 0.01 to 3 mm, preferably 0.1 to 1 mm, most preferably 0.15 to 0.5 mm. Alternatively, the capillary passage can be defined by transverse cross sectional area of the passage, which can be $8 \times 10^{-5}$ to 7 mm$^2$, preferably $8 \times 10^{-3}$ to $8 \times 10^{-1}$ mm$^2$ and more preferably $2 \times 10^{-2}$ to $2 \times 10^{-1}$ mm$^2$. Many combinations of a single or multiple capillaries, various pressures, various capillary lengths, amounts of heat applied to the capillary, and different cross-sectional areas will suit a given application.

The liquid alcohol or alcohol-gasoline blend can be supplied to the capillary flow passage under a pressure of at least 10 psig, preferably at least 20 psig. In the case where the capillary flow passage is defined by the interior of a stainless steel tube having an internal diameter of approximately 0.020 inch and a length of approximately 6 inches, the fuel is preferably supplied to the capillary passageway at a pressure of 100 psig or less to achieve mass flow rates required for stoichiometric start of a typical size automotive engine cylinder (on the order of 100–200 mg/s). The at least one capillary passageway provides a sufficient flow of substantially vaporized fuel to ensure a stoichiometric or nearly stoichiometric mixture of fuel and air that can be ignited and combusted within the cylinder(s) of an engine without producing undesirably high levels of unburned hydrocarbons or other emissions. The capillary tube also is characterized by having a low thermal inertia, so that the capillary passageway can be brought up to the desired temperature for vaporizing fuel very quickly, preferably within 2.0 seconds, more preferably within 0.5 second, and most preferably within 0.1 second, which is beneficial in applications involving cold starting an engine.

During vaporization of the liquid alcohol or alcohol-gasoline blend in a heated capillary passage, deposits of carbon and/or heavy hydrocarbons can accumulate on the capillary walls and the flow of the fuel can be severely restricted which ultimately can lead to clogging of the capillary flow passage. The rate at which these deposits accumulate is a function of capillary wall temperature, fuel flow rate and fuel type. It is believed that fuel additives may be useful in mitigating the formation of such deposits. However, should clogging develop, such clogging can be cleared by oxidizing the deposits.

FIG. 1 presents a fuel injector 10 for vaporizing an alcohol or alcohol-gasoline blend drawn from a source of fuel, in accordance with the present invention. Apparatus 10 includes a capillary flow passage 12, having an inlet end 14 and an outlet end 16, inlet end 14 in fluid communication with a liquid alcohol or alcohol-gasoline blend source F for introducing the liquid fuel in a substantially liquid state into capillary flow passage 12.

As is preferred, a needle valve assembly 18 is operated by solenoid 28. Solenoid 28 has coil windings 32 connected to electrical connector 30. When the coil windings 32 are energized, the solenoid element 36 is drawn into the center of coil windings 32. When electricity is cut off from the coil windings 32, a spring 38 returns the solenoid element to its original position. A needle 40 is connected to the solenoid element 36. Movement of the solenoid element 36, caused by applying electricity to the coil windings 32, causes the needle 40 to be drawn away from an orifice 42 allowing fuel to flow through the orifice 42.

A heat source 20 is arranged along capillary flow passage 12. As is most preferred, heat source 20 is provided by forming capillary flow passage 12 from a tube of electrically resistive material, a portion of capillary flow passage 12 forming a heater element when a source of electrical current is connected to the tube at connections 22 and 24 for delivering current therethrough. Heat source 20, as may be appreciated, is then operable to heat the liquid alcohol or alcohol-gasoline blend in capillary flow passage 12 to a level sufficient to change at least a portion thereof from a liquid state to a vapor state and deliver a stream of substantially vaporized fuel from outlet end 16 of capillary flow passage 12.

The heated capillary flow passage 12 can produce a vaporized stream of fuel, which condenses in air to form a mixture of vaporized fuel, fuel droplets, and air commonly referred to as an aerosol. Compared to a conventional automotive port-fuel injector, which delivers a fuel spray comprised of droplets in the range of 100 to 300 μm Sauter Mean Diameter (SMD), the aerosol has an average droplet size of less than 25 μm SMD, preferably less than 15 μm SMD. Thus, the majority of the fuel droplets produced by the heated capillary according to the invention can be carried by an air stream, regardless of the flow path, into the combustion chamber.

The difference between the droplet size distributions of a conventional injector and the heated capillary flow passage according to the invention is particularly critical during cold-start and warm-up conditions. Specifically, using a conventional port-fuel injector, relatively cold intake manifold components necessitate over-fueling such that a sufficient fraction of the large fuel droplets, impinging on the intake components, are evaporated to produce an ignitable fuel/air mixture. Conversely, the vaporized fuel and fine droplets produced by the fuel injector of the present invention are essentially unaffected by the temperature of engine components upon start-up and, as such, eliminate the need for over-fueling during engine start-up conditions. The elimination of over-fueling combined with more precise control over the fuel/air ratio to the engine afforded through the use of the heated capillary injector of the present invention results in greatly reduced cold start emissions compared to those produced by engines employing conventional fuel injector systems. In addition to a reduction in over-fueling, it should also be noted that the heated capillary injector according to the invention further enables fuel-lean operation during cold-start and warm-up, which results in a greater reduction in tailpipe emissions while the catalytic converter warms up.

Referring still to FIG. 1, capillary flow passage 12 can comprise a metal tube such as a stainless steel capillary tube and the heater comprising a length of the tube 20 through which electrical current is passed. In a preferred embodiment, the capillary tube is provided with an internal diameter of approximately 0.02 to 0.03 inches, a heated length of approximately 1 to 10 inches, and fuel can be supplied to the tube 12 at a pressure of less than 100 psig, preferably less than 70 psig, is more preferably less than 60 psig and even more preferably less than 45 psig. It has been shown that this embodiment produces vaporized fuel, which forms a distribution of aerosol droplets, which mostly range in size from 2 to 30 μm SMD with an average droplet size of about 5 to 15 μm SMD, when the vaporized fuel is condensed in air at ambient temperature. The preferred size of fuel droplets to achieve rapid and nearly complete vaporization at cold-starting temperatures is less than about 25 μm. This result can be achieved by applying approximately 100 to 400 W, e.g., 200 W of electrical power, which corresponds to 2–3% of the energy content of the vaporized fuel, to a six-inch stainless steel capillary tube.

Electrical power can be applied to the capillary tube by forming the tube entirely from an electrically conductive material such as stainless steel, or by providing a conductive material over at least a portion of a non-electrically conducting tube or laminate having a flow passage therein such as by laminating or coating an electrically resistive material to form a resistance heater on the tube or laminate. The resistive component of the capillary is chosen based on the material's temperature coefficient of resistance. The temperature of the material can be controlled by applying power to achieve a target resistance. Electrical leads can be connected to the electrically conductive material to supply the electrical current to the heater so as to heat the tube along its length. Alternatives to heating the tube along its length could include other sources of heat positioned relative to the flow passage to heat the length of the flow passage through one or a combination of conductive, convective or radiative heat transfer.

Although a preferred capillary tube has a heated length of approximately 6 inches and an internal diameter of approximately 0.020 inches, other configurations of capillaries provide acceptable vapor quality. For example, the internal diameter can range from 0.02 to 0.03 inch and the heated portion of the capillary tube can range from 1 to 10 inches. After cold-start and warm-up, it is not necessary to heat the capillary tube and the unheated capillary tube can be used to supply adequate liquid fuel to an engine operating at normal temperature.

The vaporized alcohol or alcohol-gasoline blend exiting the capillary can be injected into an engine intake manifold at the same location as conventional port-fuel injectors or at another location along the intake manifold. If desired, however, the fuel capillary can be arranged to deliver vaporized fuel directly into each cylinder of the engine. The capillary provides advantages over systems that produce larger droplets of fuel that must be injected against the backside of a closed intake valve while starting the engine. Preferably, the outlet of the fuel capillary tube is positioned flush with the intake manifold wall similar to the arrangement of the outlets of conventional fuel injectors.

After approximately 20 seconds (or preferably less) from starting the engine, the power used to heat the capillary flow passage 12 can be turned off and liquid injection initiated using conventional fuel injectors, for normal engine operation. Normal engine operation can alternatively be performed by liquid alcohol or alcohol-gasoline blend injection through an unheated capillary flow passage 12 via continuous injection or pulsed injection.

Figure 2:
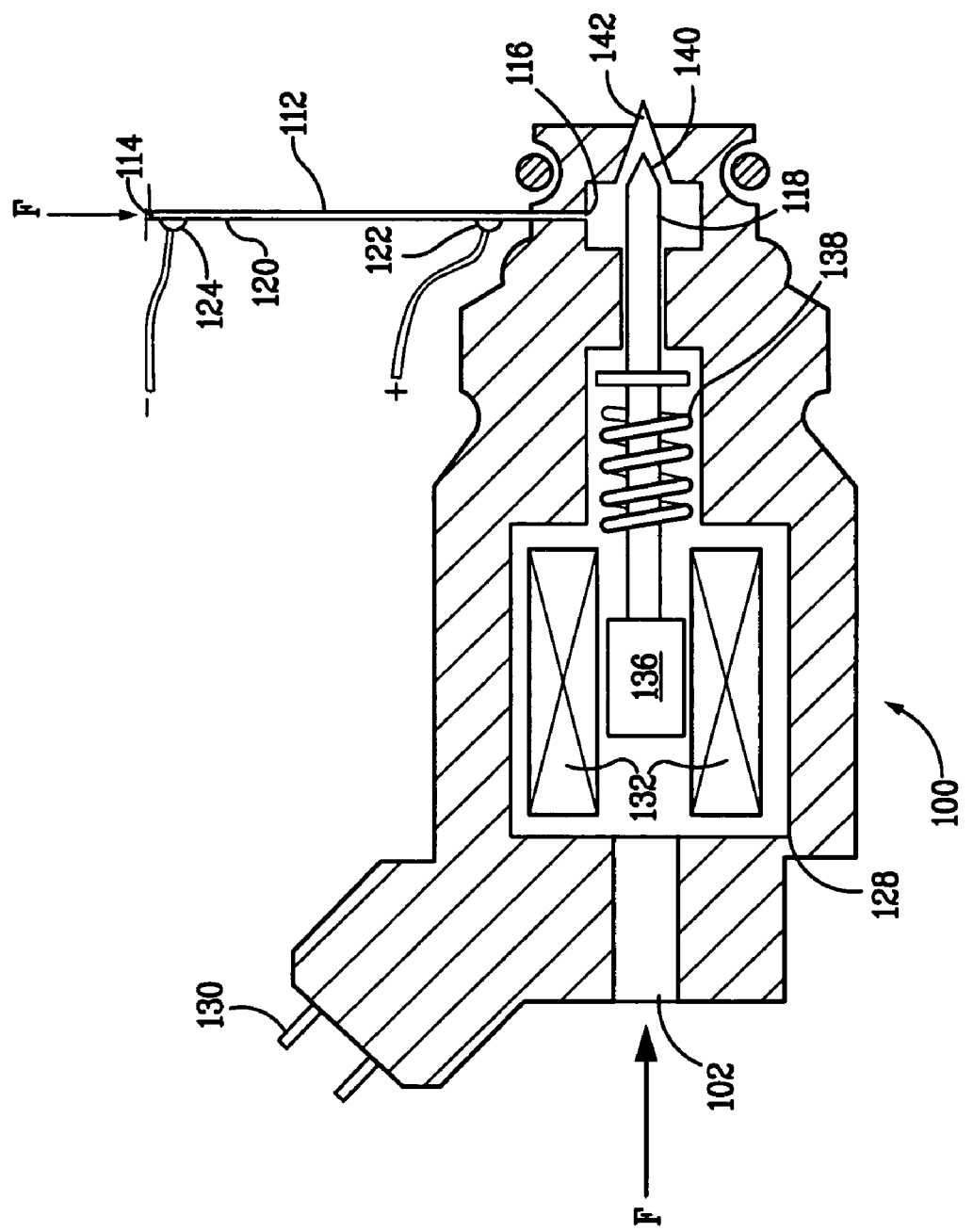
FIG. 2 presents another vapor-liquid in-line-heated injector having an electrically heated capillary, in partial cross section, capable of also providing a stream of liquid fuel according to another preferred form.

Referring to FIG. 2, a dual vapor/liquid fuel injector 100 is shown. Vapor/liquid fuel injector 100 includes a capillary flow passage 112, having an inlet end 114 and an outlet end 116, inlet end 114 in fluid communication with a liquid alcohol or alcohol-gasoline blend source F for introducing the liquid fuel in a substantially liquid state into capillary flow passage 112 and liquid passage 102.

A needle valve assembly 118 is operated by solenoid 128 and is used to control the flow of fuel from capillary flow passage 112 and/or liquid passage 102. Solenoid 128 has coil windings 132 connected to electrical connector 130. When the coil windings 132 are energized, the solenoid element 136 is drawn into the center of coil windings 132. As previously described, when electricity is cut off from the coil windings 132, a spring 138 returns the solenoid element to its original position. A needle 140 is connected to the solenoid element 136. Movement of the solenoid element 136, caused by applying electricity to the coil windings 132, causes the needle 140 to be drawn away from an orifice 142 allowing fuel to flow through the orifice 142.

A heat source 120 is arranged along capillary flow passage 112. As is most preferred, heat source 120 is provided by forming capillary flow passage 112 from a tube of electrically resistive material, a portion of capillary flow passage 112 forming a heater element when a source of electrical current is connected to the tube at connections 122 and 124 for delivering current. Heat source 120, as may be appreciated, is then operable to heat the liquid alcohol or alcohol-gasoline blend in capillary flow passage 112 to a level sufficient to change at least a portion thereof from a liquid state to a vapor state and deliver a stream of substantially vaporized fuel from outlet end 116 of capillary flow passage 112. After about 20 seconds from starting the engine, or preferably less, flow to the capillary flow passage 112 can be terminated and the conventional liquid passage 102 activated for continued operation of the engine.

Figure 3:
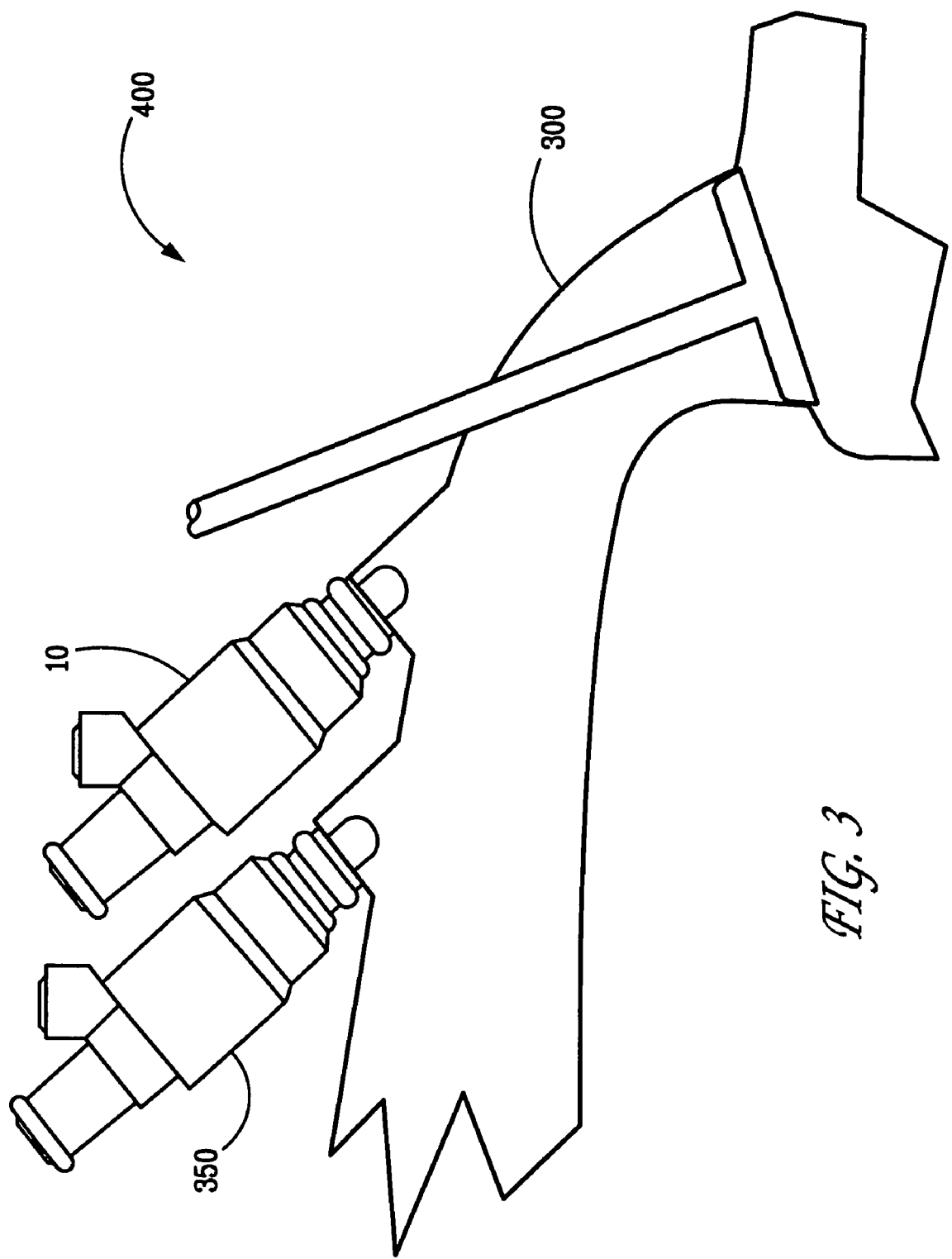
FIG. 3 is a side view of another embodiment employing dual injectors in accordance with still another preferred form.

Referring now to FIG. 3, an engine intake port 300 is fitted with a heated capillary injector 10 (of the type described with reference to FIG. 1) and a conventional liquid fuel injector 350. In this embodiment, fuel will be delivered to the engine by the capillary flow passage (not shown), heated along its length, during the cold-start and warm-up of the engine. After the first approximately 20 seconds from starting the engine, or preferably less, the heated capillary injector 10 will be deactivated and the conventional fuel injector 350 activated for normal operation of the engine.

Figure 4:
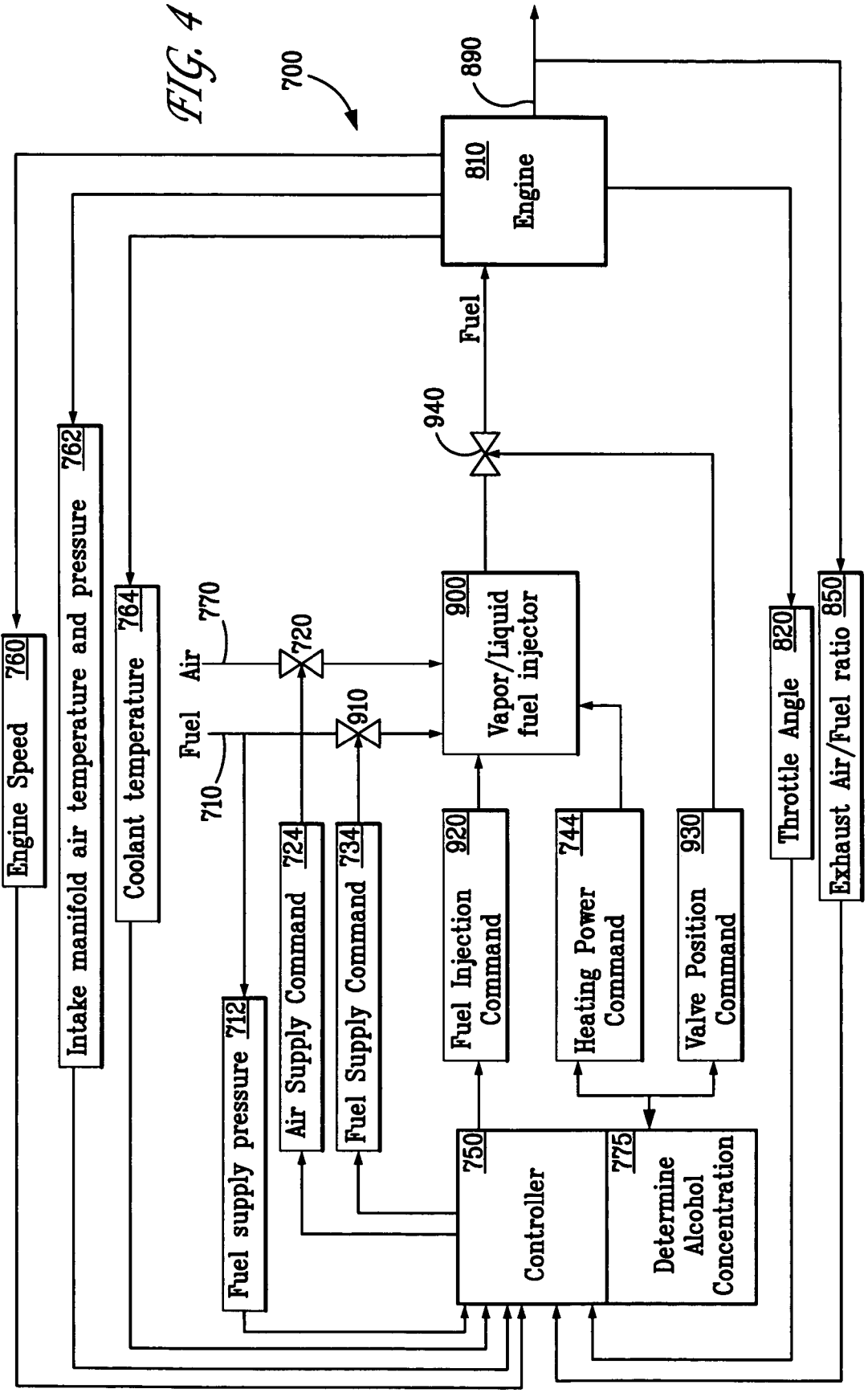
FIG. 4 is a schematic of an engine/controller configuration in which a vapor/liquid fuel injector is used to deliver both vaporized and liquid fuel to the engine, in accordance with still another preferred form.

As shown in FIG. 4, fuel delivery to a capillary flow passage can be effected by a controller 750. The controller 750 may also effect adjustment of the pressure of the liquid fuel and/or the amount of heat supplied to the capillary flow passage based on one or more sensed conditions, as will be explained below. The sensed conditions may include inter alia: the fuel pressure 712, the capillary temperature and the air fuel ratio 850. The controller 750 may also control multiple fuel delivery devices attached to the application. As will be appreciated by those skilled in the art, the controller 750 may also control one or more capillary flow passages to clear deposits. For example, cleaning of a capillary flow passage can be achieved by applying heat to the capillary flow passage and supplying a flow of an oxidant source to the capillary flow passage.

A capillary fuel injector, of the type shown in FIGS. 1–3, may be used with or without a conventional liquid fuel injector, or may be configured such that it accommodates the delivery of both liquid and vapor fuel. Still referring to FIG. 4, control system 700 is used to operate an internal combustion engine 810 incorporating a fuel supply valve 940 in fluid communication with a liquid fuel supply 710 and a fuel injection path 900, and an oxidizing gas supply valve 720 in fluid communication with an oxidizing gas supply 770 and capillary flow passages. The control system includes a controller 750 which typically receives a plurality of input signals from a variety of engine sensors such as engine speed sensor 760, intake manifold air thermocouple and pressure sensor 762, coolant temperature sensor 764, exhaust air-fuel ratio sensor 850 and fuel supply pressure 712. In operation, the controller 750 executes a control algorithm based on one or more input signals and subsequently generates an output signal 724 to the oxidizer supply valve 720 for cleaning clogged capillary passages in accordance with one embodiment of the invention, an output signal 930 to the fuel supply valve 940, an output signal 734 to the fuel supply valve 910, and a heating power command 744 to a power supply which delivers power to heat to the capillaries.

Still referring now to FIG. 4, signals to the engine control unit (ECU) 750, respectively, include fuel supply pressure 712, coolant temperature 764, intake manifold air temperature and pressure 762, engine speed 760, throttle angle 820, and exhaust air/fuel ratio 850. Similarly, the output signals from the ECU 750 are an air supply command 724, a fuel supply command 734, a fuel injection command 920 and a heating power command 744. As may be seen by reference to FIG. 2, fuel and vapor will flow through the same exit path out of the injector. However, since the open area required for the flow of liquid fuel is smaller than that required for vapor fuel injection, the injector will supply a larger mass flow rate of liquid fuel than vaporized fuel at a given duty cycle.

As may be appreciated, signals from the engine 810 are sent to the engine controller 750, which then uses these signals to perform several functions related to the injection of vaporized fuel including determining the phase of fuel (liquid or vapor) that should be delivered to the engine 810 for minimal emissions. The controller 750 also determines the alcohol concentration of the fuel via an algorithm and injects the appropriate amount of fuel in order to start and warm up the engine and minimize emissions, while controlling the power supplied to the heated capillary injector 900 to achieve a target resistance, which translates into a desired target temperature and phasing over to liquid fuel injection.

Figure 5:
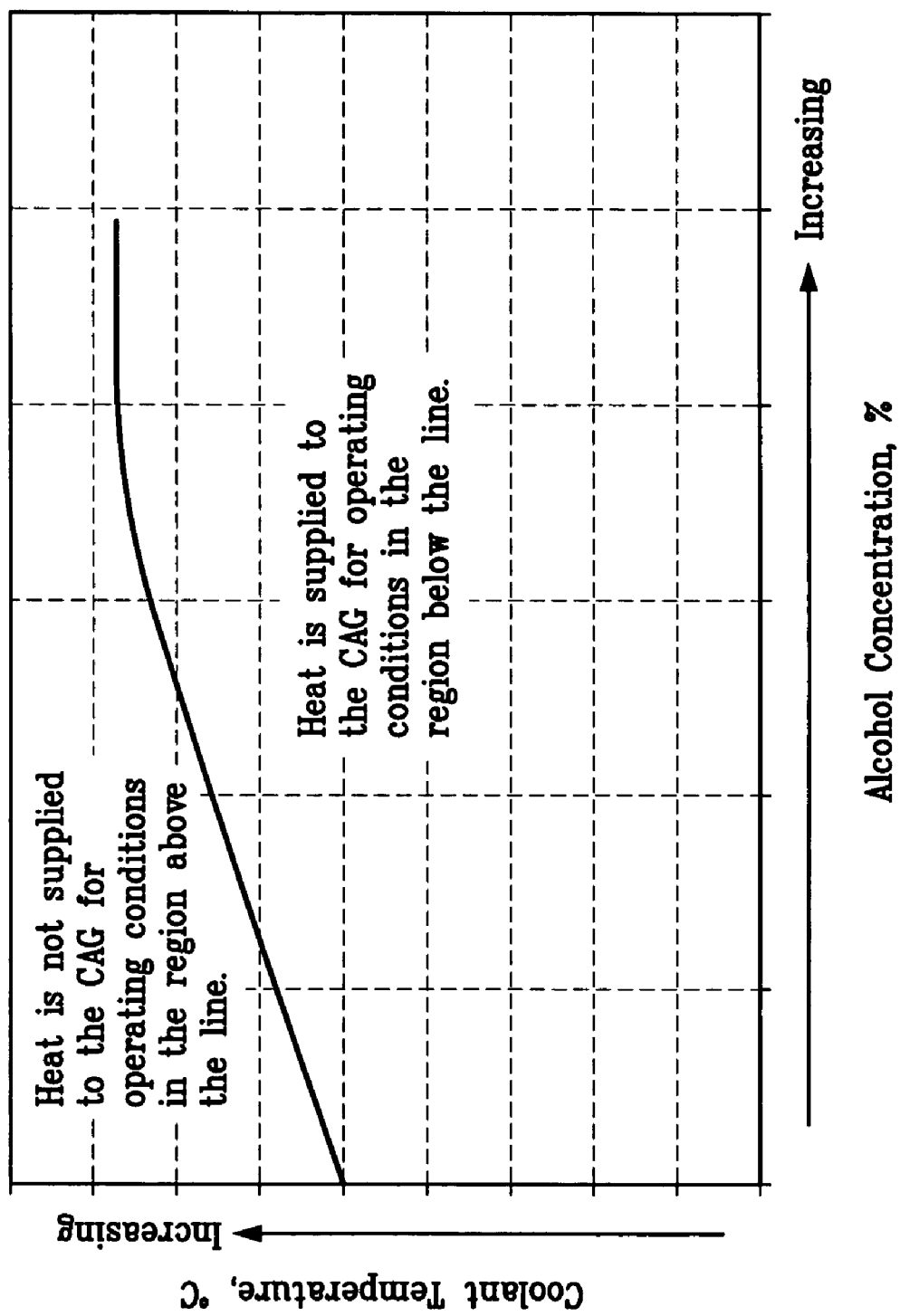
FIG. 5 is an illustrative representation of the qualitative relationship between alcohol concentration, sensed coolant temperature and heat supplied to the capillary flow passage.

For illustrative purposes, FIG. 5 depicts the qualitative relationship between alcohol concentration, sensed coolant temperature and heat supplied to the capillary passage of the capillary fuel injector. As indicated, increasing the alcohol concentration of the fuel results in an increase in the threshold coolant temperature for activating the heating of the capillary passage. This is required since increased alcohol concentration results in a fuel mixture that is more difficult to ignite under cold start conditions. As a result, heating is enabled over a wider range of operating conditions for higher concentrations of alcohol in the alcohol-gasoline fuel blends.

Figure 6:
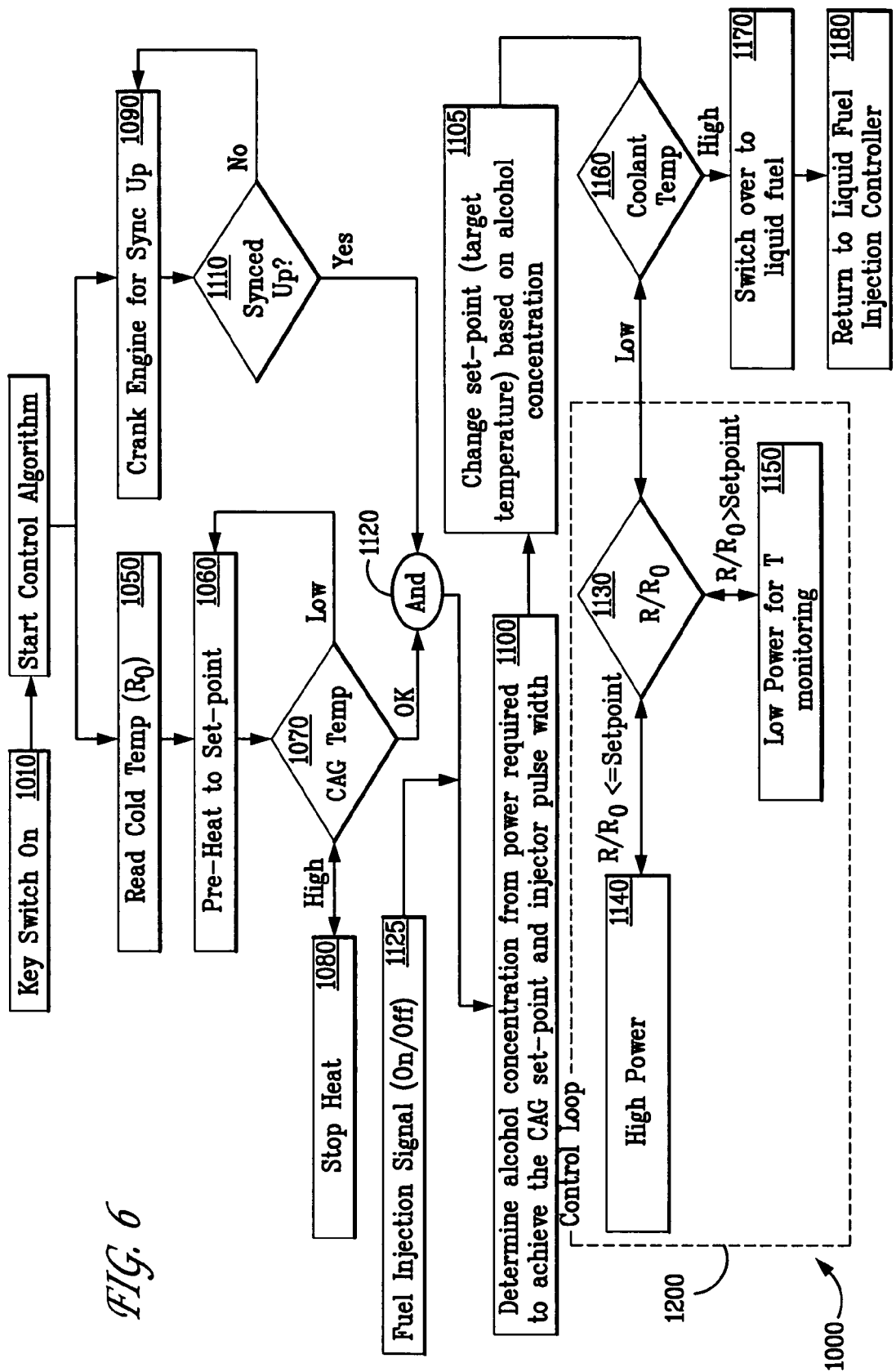
FIG. 6 is a vapor/liquid fuel injector control algorithm in which power to the injector is controlled via a binary (high/low) power source, in accordance with still another preferred form.

An example of a preferred control algorithm is shown schematically in FIG. 6. As shown, if the signal representative of degree of engine warm-up, such as coolant temperature, is below the set-point, the ECU will pre-heat the capillary flow passage 1060 and, optionally, synchronize the engine 1090 for open valve injection through increased cranking time. In the embodiment of FIG. 6, the capillary flow passage preheat temperature is achieved through a basic on/off control loop in which heat is supplied to the capillary until the target temperature 1070 (resistance) is measured. When the temperature reaches the target value 1070, and the engine is still cranking, the heat to the capillary flow passage is removed (1080) for a short period of time to allow the temperature to drop slightly.

After this short "off" period, power is again supplied to the capillary flow passage in order to measure the temperature. At this point the control loop is continued.

The fuel injector control algorithm 1000 of FIG. 6 controls power to the injector via a binary (high/low) power source. The control algorithm 1000 is initiated by placing the automobile's key switch in the "on" position 1010. In the determination of the type of fuel (liquid or vapor) to be delivered to the engine, signal 1160, which may be coolant temperature or other signal representative of degree of engine warm-up (e.g., lubricant temperature, intake manifold air temperature or time elapsed from engine start-up) is compared to a set-point. If the coolant, lubricant, or intake manifold air temperature, as the case may be, is greater than or equal to the set-point, the engine controller will specify liquid fuel delivery to the engine. Likewise, if the engine is running and the time elapsed from engine start-up is greater than or equal to a set-point (e.g. 5 minutes), the engine controller will specify liquid fuel delivery to the engine.

Once the capillary target temperature 1070 is reached and, optionally, the engine is synchronized for open valve injection 1090, the injector is set to receive the fuel injection command from the ECU. Given the relatively low thermal mass associated with the heated capillary delivery method, this warm-up process is expected to take significantly less than 0.5 seconds and, more preferably on the order of 0.1 seconds. Thus, the rate-limiting step in this phase of injector operation will be the synchronization of the engine 1090, if such a process is included in the engine start-up strategy. As indicated, heat is initially supplied to the capillary flow passage while the engine is cranked for synced up fuel injection.

It has been found that once the capillary flow passage has been heated to the target temperature, the power required to achieve the appropriate mass flow rate of vapor provides a direct indication of the fraction of alcohol in the fuel. As will be appreciated, the method and apparatus disclosed herein advantageously benefit from the fundamental differences existing between the heat of vaporization and the specific heat for alcohol and alcohol fuel blends. For example, the heat of vaporization values for gasoline, methanol and ethanol are 350 kJ/kg, 1,100 kJ/kg and 800 kJ/kg, respectively. The specific heat values (liquid state) for gasoline, methanol and ethanol are 2.4 kJ/kg $^\circ$ K, 2.6 kJ/kg $^\circ$ K and 2.5 kJ/kg $^\circ$ K, respectively. The stoichiometric air fuel ratio values (mass basis) for gasoline, methanol and ethanol are about 14.6:1, 6.47:1 and 9.0:1, respectively. As such, for stoichiometric mixtures, the energy required to heat a fuel 50$^\circ$ K for 1 kg of air consumption is as follows:

Gasoline: $2.4 \times 1/14.6 \times 50 = 8.2$ kJ;

Methanol: $2.6 \times 1/6.47 \times 50 = 20.1$ kJ; and

Ethanol: $2.5 \times 1/9.0 \times 50 = 13.9$ kJ.

In contrast therewith, the energy required to vaporize a fuel at the same level of air consumption (1 kg of air) is as follows:

Gasoline: $350 \times 1/14.6 = 24$ kJ;

Methanol: $1,100 \times 1/6.47 = 170$ kJ; and

Ethanol: $800 \times 1/9.0 = 89$ kJ.

As such, the ability to determine and resolve differences in alcohol content for an alcohol fuel blend is far greater for a blend existing in the vapor state, as opposed to a liquid state.

To further demonstrate, note that for a 10% methanol/gasoline blend, the energy required to heat the blend 50$^\circ$ K for 1 kg of air consumption is:

8.2 kJ$\times$0.9+20.1 kJ$\times$0.1=9.39 kJ (versus 8.2 kJ for 100% gasoline), while the energy required to vaporize the same blend at the same level of air consumption (1 kg of air) is:

24 kJ$\times$(0.9)+170 kJ$\times$(0.1)=38.6 kJ, (versus 24 kJ for 100% gasoline).

Figure 7:
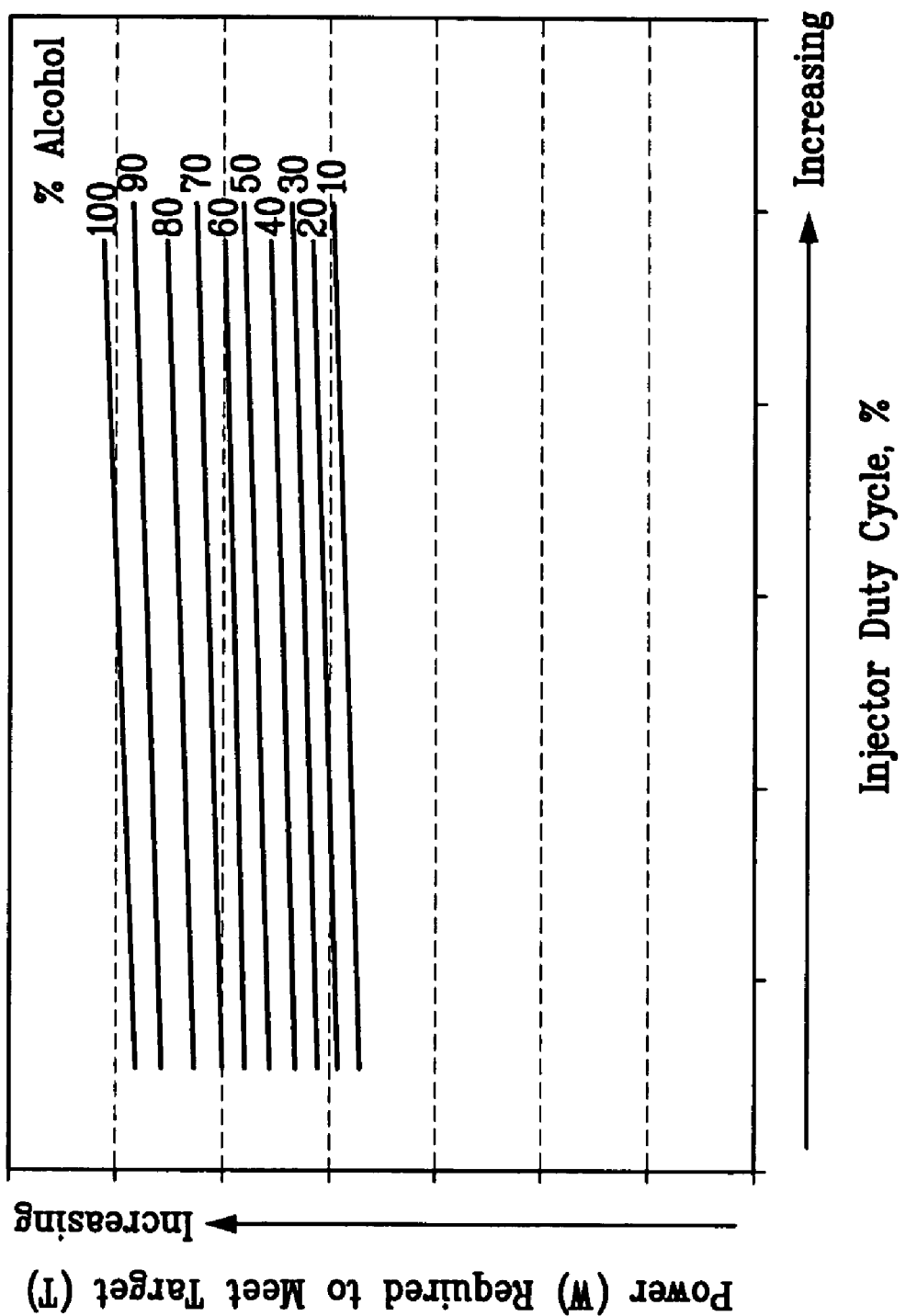
FIG. 7 presents the qualitative relationship between mass flow (injector duty cycle), capillary flow passage heater power and alcohol concentration.

For illustrative purposes, the relationship between mass flow, power to the capillary flow passage heater and alcohol concentration is qualitatively shown in FIG. 7. As indicated in FIG. 7, the power required for achieving a given mass flow rate of fuel increases with alcohol concentration. The alcohol concentration of the fuel is determined at step 1100 by using injector pulse width and the power required to achieve the target resistance set point. The power required for achieving the target capillary flow passage heater resistance ($R/R_0$|target) at a given pulse-width of the capillary fuel injector is translated into the alcohol concentration of the fuel via lookup tables or mathematical representations of the relationship shown qualitatively in FIG. 7.

In one embodiment of the invention, once the initial alcohol concentration is determined at step 1100, the capillary flow passage heating power requirement and the injector duty cycle are periodically monitored and translated into alcohol fuel concentration throughout the drive cycle. This allows the control algorithm 1000 to be robust with respect to the initial estimate of alcohol in the fuel. That is, such a methodology guards against sub-optimal engine performance if the initial alcohol concentration in the fuel line differs significantly from the alcohol concentration in the fuel tank. Information regarding the alcohol concentration in the alcohol-gasoline blend is passed to other ECU control functions so that spark timing, fuel injection quantity and/or idle speed are adjusted to account for the alcohol concentration of the fuel blend. Such modifications of control strategies based on alcohol concentration are well known by those skilled in the art.

In the injection of the appropriate amount of fuel for cold-start and warm-up of the engine, the amount of vaporized fuel that is introduced into the engine during cold-start and warm-up is determined in accordance with the means, represented schematically in FIG. 4. Referring again to FIG. 4, as may be appreciated, this phase of fuel injection may be governed by an open-loop control algorithm in which the amount of fuel injected is determined through look-up maps based on factors such as engine speed 760 and accelerator position or throttle angle 820. Alternatively, fuel injection may be governed by a feedback control loop in which the exhaust air/fuel ratio signal 850 is used to determine the injected amount of fuel or a predictive control algorithm governed by the throttle angle 820. In still another embodiment, the throttle angle signal 820 is passed to the ECU 750 and a predictive control strategy is used to determine the quantity of fuel required for the given engine conditions.

Referring again to FIG. 6, to ensure that high quality vapor is injected into the engine throughout the cold-start and warm-up period, a technique is provided for controlling the power to the capillary flow passage to maintain a target resistance (i.e., temperature), as the fuel delivery is pulsed and/or the engine fueling requirements change. This is depicted in the "Control Loop" 1200 in FIG. 6. As shown in FIG. 6, the resistance of the capillary flow passage is used as a feedback to determine the appropriate adjustment in power to the capillary flow passage to maintain the target ratio of measured resistance to cold capillary flow passage resistance (R/Ro) 1130.

The embodiment shown in FIG. 6 depicts a step-wise or digital control algorithm where high power 1140 is supplied to heat the capillary if R/Ro 1130 is less than or equal to the set point. Conversely, low power 1150 is supplied to the capillary flow passage when R/Ro 1130 is greater than the set-point. Under such low power conditions the device undergoes conductive cooling while resistance is measured and passed back to the controller.

Figure 8:
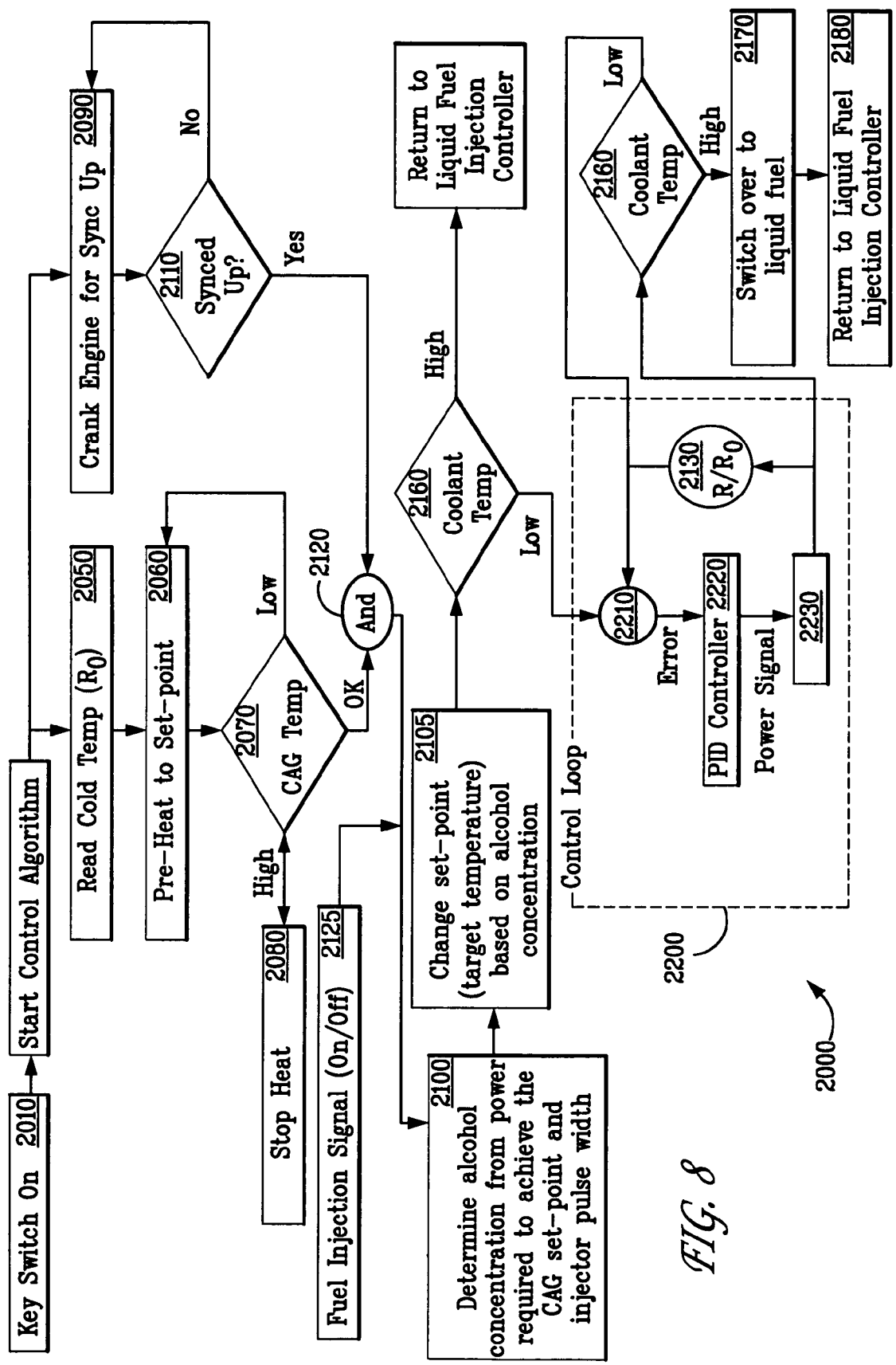
FIG. 8 is a vapor/liquid fuel injector control algorithm in which power to the injector is controlled via a proportional integral derivative controller, in accordance with still another preferred form.

Referring now to FIG. 8, a vapor/liquid fuel injector control algorithm 2000 in which power to the injector is controlled via a proportional integral derivative controller (PID) is shown. PID controllers are available from a wide variety of companies, including West Instrument, LFE, Watlow and Gentran, as well as automotive control suppliers. PID controllers advantageously provide for the accurate maintenance of a control setpoint by adjusting the control outputs. This permits a temperature to be controlled with minimal oscillations around the setpoint.

In the control algorithm of FIG. 8, the control algorithm 2000 begins with positioning the automobile's key switch to the "on" position. The coolant temperature 2160, or other signal representative of degree of engine warm-up (e.g., lubricant temperature, intake manifold air temperature or time elapsed from engine start-up), is compared to a set-point. If the coolant, lubricant, or intake manifold air temperature, as the case may be, is greater than or equal to the set-point, the engine controller will specify liquid fuel delivery to the engine. Likewise, if the engine is running and the time elapsed from engine start-up is greater than or equal to a set-point (e.g. 5 minutes), the engine controller will specify liquid fuel delivery to the engine.

Alternatively, if the signal representative of degree of engine warm-up, such as coolant temperature, is below the set-point, the ECU will pre-heat the capillary flow passage 2060 and, optionally, synchronize the engine 2090 for open valve injection through increased cranking time. It is important to note that several types of control methodologies including a model-based control can also be used.

Once the capillary target temperature 2060 is reached and, optionally, the engine is synchronized for open valve injection 2090, the injector is set to receive the fuel injection command from the ECU. Again, since this warm-up process is expected to take significantly less than 0.5 seconds and, more preferably on the order of 0.1 seconds, the rate-limiting step will be the synchronization of the engine 2090, if such a process is included in the engine start-up strategy. Heat is initially supplied to the capillary flow passage while the engine is cranked for synced-up fuel injection.

As indicated above, it has been found that once the capillary flow passage has been heated to the target temperature, the power required to achieve the appropriate mass flow rate of vapor provides a direct indication of the fraction of alcohol in the fuel. As indicated in FIG. 7, the power required for achieving a given mass flow rate of fuel increases with alcohol concentration. The alcohol concentration of the fuel is determined at step 2100 by using injector pulse width and the power required to achieve the target resistance set point. The power required for achieving the target capillary flow passage heater resistance (R/R$_o$|target) at a given pulse-width of the capillary fuel injector is translated into the alcohol concentration of the fuel via lookup tables or mathematical representations of the relationship shown qualitatively in FIG. 7.

In one embodiment of the invention, once the initial alcohol concentration is determined at step 2100, the capillary flow passage heating power requirement and the injector duty cycle are periodically monitored and translated into alcohol fuel concentration throughout the drive cycle. This allows the control algorithm 2000 to be robust with respect to the initial estimate of alcohol in the fuel. Information regarding the alcohol concentration in the alcohol-gasoline blend is passed to other ECU control functions so that spark timing, fuel injection quantity and/or idle speed are adjusted to account for the alcohol concentration of the fuel blend. Such modifications of control strategies based on alcohol concentration are well known by those skilled in the art.

Still referring to FIG. 8, to inject the appropriate amount of fuel for cold-start and warm-up of the engine, the amount of vapor that is introduced into the engine during cold-start and warm-up is determined in accordance with the system represented schematically in FIG. 4. Referring again to FIG. 4, as may be appreciated, this phase of fuel injection may be governed by an open-loop control algorithm in which the amount of fuel injected is determined through look-up maps based on factors such as engine speed 760 and throttle angle 820. Alternatively, fuel injection may be governed by a feedback control loop in which the exhaust air/fuel ratio signal 850 is used to determine the injected amount of fuel or a predictive control algorithm governed by the throttle angle 820. In still another embodiment, the throttle angle signal 820 is passed to the ECU 750 and a predictive control strategy is used to determine the quantity of fuel required for the given engine conditions.

To ensure that high quality vapor is injected into the engine throughout the cold-start and warm-up period, the present invention specifies a method of controlling the power to the capillary flow passage to maintain a target resistance (i.e., temperature) 2130, as the fuel delivery is pulsed and/or the engine fueling requirements change. This is shown as the "Control Loop" 2200. As shown in FIG. 8, the resistance of the capillary flow passage is used as a feedback to determine the appropriate adjustment in power to the capillary flow passage to maintain the target ratio of measured resistance to cold capillary flow passage resistance ($R/R_o$) 2130.

The embodiment shown in FIG. 8 depicts an analog control algorithm (a PID controller) where the resistance of the capillary flow passage in the previous time-step is used as the basis for a finite correction to the power supplied to the capillary flow passage in the current time-step. Through such an analog control methodology, the power supplied to the capillary flow passage may span the entire spectrum from zero to the maximum allowable value. However, ideally, the power to the capillary flow passage will be significantly less than the available power such that the control algorithm can effectively respond to sudden changes in engine operating conditions.

As those skilled in the art will readily understand, look-ahead controls are incorporated into the capillary flow passage control algorithm. Specifically, the intake valve actuation signal is incorporated into the control algorithm such that this signal serves as a precursor to the flow of fuel through the one or more capillary flow passages. Upon receiving the intake valve actuation signal, the power to the capillary flow passage is increased such that the capillary flow passage is at sufficient temperature to fully vaporize the fuel flow once the fuel injector is open.

As implied above, the use of an appropriate resistance set-point is critical to the performance of the capillary flow passage-based fuel injector. That is, a low set-point will result in a lack of heat delivered to the fuel which, in turn, will result in poor quality vapor delivered to the engine. Conversely, a high set-point will result in a local hot spot near the end of the capillary such that the temperature of the rest of the capillary is significantly lower than the mean temperature as represented by the resistance of the capillary. Consequently, such a condition results in poor vapor quality as well.

Figure 9:
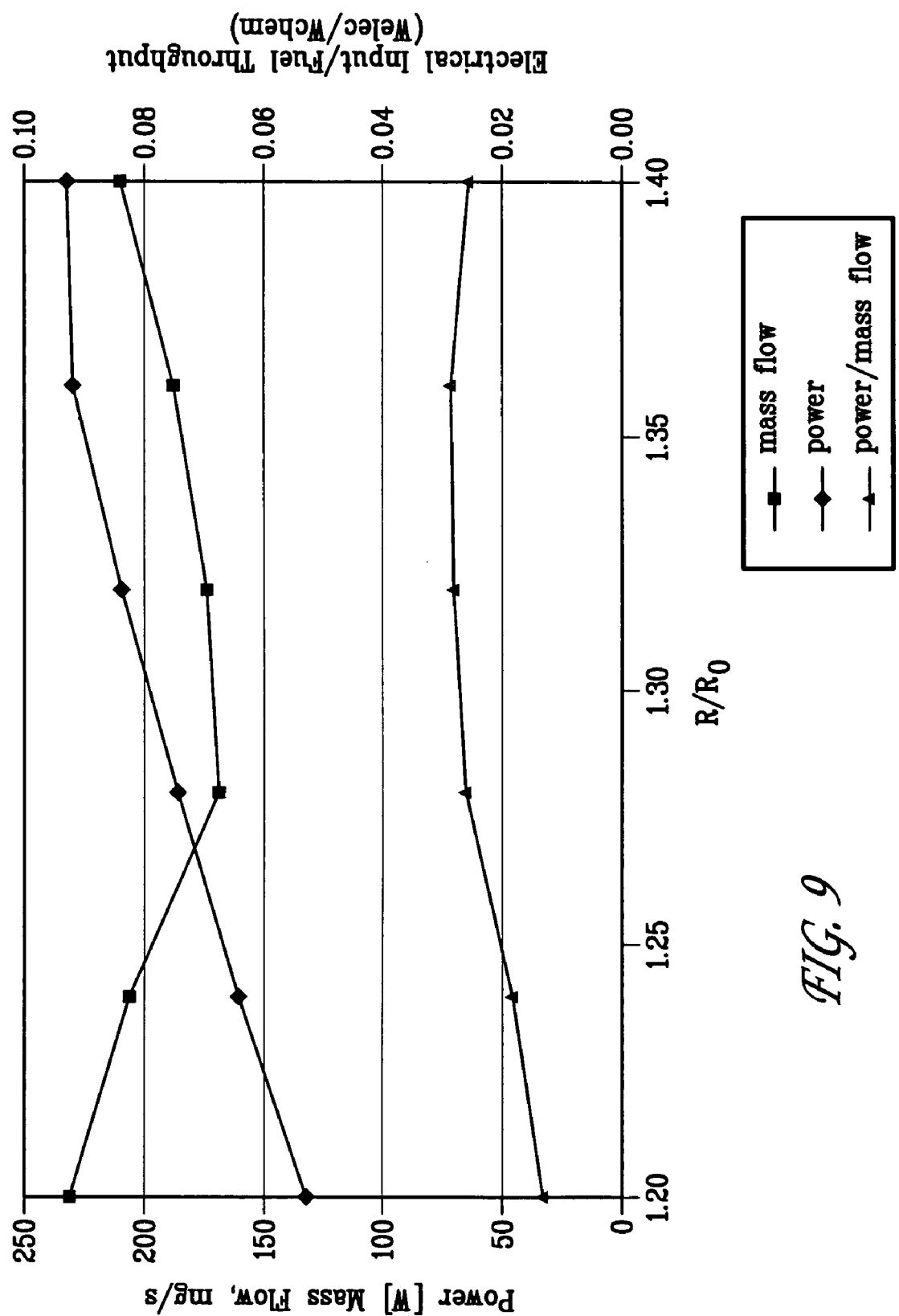
FIG. 9 is an empirically determined resistance set-point for a vapor fuel injector.

Based on these observations, it has been empirically determined that the preferred resistance set-point for a given capillary generally corresponds to the point at which the ratio of power to mass flow through the capillary is maximized. An example of the empirically determined resistance set point for a capillary passage is shown in FIG. 9. It is important to note that a preferred resistance set-point for a given capillary flow passage is largely insensitive to fuel pressure.

As indicated in FIG. 6 and FIG. 8, in parallel to the control of R/Ro 1130 and 2130, respectively, the coolant temperature 1160 and 2160 is continually compared to the set point, which signifies fully warm engine conditions. If the coolant temperature is below the respective set-point, heat continues to be supplied to the capillary flow passage via the capillary flow passage control loop 1200 and 2200, respectively, and, thus, high quality fuel vapor continues to be delivered to the engine. Conversely, if the coolant temperature 1160 and 2160 is above the set-point for warm engine operation, the control algorithm begins the phase over to liquid fuel. Alternatively, a timer may be used to determine when the engine reaches fully warm operation, the set point established on the basis of empirical testing.

The process of switching over from vaporized to liquid fuel can take any of several forms and will be a function of the particular capillary flow passage injector configuration employed. In one approach to switching over to liquid fuel, the coolant temperature signal is used to actuate a switching valve and optionally disable power to the capillary flow passage, which directs the fuel supply away from the capillary flow passage and toward a conventional liquid fuel injection flow passage. In practice, this approach will require the fuel injector configuration shown schematically in FIG. 3.

In conjunction with an injector configuration generally depicted in FIG. 4, whereby both vaporized and liquid fuel are delivered to the engine via the same flow passage 900, the coolant temperature signal 764 is used to disable power to the capillary flow passage and actuate 930 a change at the injector exit 940 or a change in the injector duty cycle that will result in less time available for fuel to flow. Given the very low thermal inertia associated with the capillary flow passages disclosed herein used to vaporize fuel, the change over from vapor to liquid fuel injection through the removal of power to the capillary can be approximated as binary in practice.

While the subject invention has been illustrated and described in detail in the drawings and foregoing description, the disclosed embodiments are illustrative and not restrictive in character. All changes and modifications that come within the scope of the invention are desired to be protected. As an example, a plurality of capillary passages can be provided, with the fuel being passed through the passages in parallel when a higher volume flow rate is desired. Alternatively, other heated fuel injectors not employing capillary passages may be used where such heated fuel injectors are capable of converting at least a portion of an alcohol or alcohol fuel blend from the liquid state to the vapor state.

What is claimed is:

1. A method for controlling a fuel system of an internal combustion engine, the fuel system including a source of liquid fuel comprising alcohol, at least one fuel injector, a heat source, for heating the liquid fuel in the at least one fuel injector the heat source capable of heating the liquid fuel to a level sufficient to convert at least a portion thereof from the liquid state to a vapor state and a metering valve operable to achieve a range of flow rates, the range of flow rates characterized by a valve open versus valve closed duty cycle, the method comprising the steps of:
   (a) metering a predetermined amount of fuel based on engine operating conditions;
   (b) controlling power supplied to the heat source of the at least one fuel injector to achieve a target temperature;
   (c) determining alcohol concentration of the fuel by
      (i) measuring the power supplied to the heat source; and
      (ii) measuring the duty cycle of the metering valve; and
   (d) adjusting the power supplied to the heat source of the at least one fuel injector based on the determination of step (c), wherein the alcohol concentration is determined using a predetermined relationship between injector mass flow rate at a measured duty cycle for the at least one fuel injector and power supplied to the heat source to achieve a target resistance set point.

2. The method of claim 1, further comprising the step of determining whether the fuel delivered to the internal combustion engine is to be delivered in the vapor state.

3. The method of claim 1, wherein the step of determining whether the fuel delivered to the internal combustion engine is to be delivered in the vapor state further comprises the steps of:
  (i) measuring a value indicative of degree of engine warm-up; and
  (ii) in the event that said value indicative of degree of engine warm-up is below a predetermined level then determining that the fuel be delivered in the vapor state, wherein the determination of (ii) is a function of the alcohol concentration determined in step (c).

4. The method of claim 2, wherein said step of determining whether the fuel should be delivered in the liquid or vapor state results in a determination that the fuel be delivered in the vapor state.

5. The method of claim 4, further comprising the step of phasing over to liquid fuel injection.

6. The method of claim 1, further comprising the step of setting a resistance value, the resistance value relatable to a predetermined target temperature, wherein the predetermined target temperature is operable to convert a portion of liquid fuel to the vapor state.

7. The method of claim 1, further comprising the step of adjusting the resistance value in response to the alcohol concentration determination.

8. The method of claim 1, wherein the heat source comprises a binary power source.

9. The method of claim 1, wherein the heat source comprises a proportional integral derivative controller.

10. The method of claim 1, wherein the at least one fuel injector includes at least one capillary flow passage.

11. The method of claim 10, wherein the heat source is arranged along the at least one capillary flow passage.

12. A method for controlling a fuel system of an internal combustion engine, the fuel system including a source of liquid fuel comprising alcohol, at least one fuel injector, a heat source for heating the liquid fuel in the at least one fuel injector, the heat source capable of heating the liquid fuel to a level sufficient to convert at least a portion thereof from the liquid state to a vapor state and a metering valve operable to achieve a range of flow rates, the range of flow rates characterized by a valve open versus valve, closed duty cycle, the method comprising the steps of:
  (a) metering a predetermined amount of fuel based on engine operating conditions;
  (b) controlling power supplied to the heat source of the at least one fuel injector to achieve a target temperature by setting a resistance value, the resistance value relatable to a predetermined target temperature, the predetermined target temperature is operable to convert a portion of liquid fuel to the vapor state;
  (c) determining alcohol concentration of the fuel by
    (i) measuring the power supplied to the heat source; and
    (ii) measuring the duty cycle of the metering valve; and
  (d) adjusting the power supplied to the heat source of the at least one fuel injector based on the determination of step (c),
wherein the alcohol concentration is determined using a predetermined relationship between injector mass flow rate at a measured duty cycle for the at least one fuel injector and power supplied to the heat source to achieve a target resistance set point 13. The method of claim 12, wherein the heat source is arranged along the at least one capillary flow passage.

* * * * *